United States Patent
Hughes et al.

(10) Patent No.: US 6,526,060 B1
(45) Date of Patent: Feb. 25, 2003

(54) DYNAMIC RATE-BASED, WEIGHTED FAIR SCHEDULER WITH EXPLICIT RATE FEEDBACK OPTION

(75) Inventors: David A. Hughes, Mountain View; Madhav V. Marathe, Cupertino, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/986,211

(22) Filed: Dec. 5, 1997

(51) Int. Cl.[7] .............................................. H04L 12/28
(52) U.S. Cl. ................................... 370/395.4; 370/412
(58) Field of Search ................................. 370/230, 231, 370/232, 235, 395, 396, 410–412, 415, 416, 413, 414, 351, 229, 233, 234, 395.4; 709/232, 234

(56) References Cited

U.S. PATENT DOCUMENTS

| | | |
|---|---|---|
| 4,430,712 A | 2/1984 | Coulson et al. |
| 4,543,626 A | 9/1985 | Bean et al. |
| 4,849,968 A | 7/1989 | Turner |
| 4,894,797 A | 1/1990 | Walp |
| 4,991,172 A | 2/1991 | Cidon et al. |
| 5,014,265 A | 5/1991 | Hahne et al. |
| 5,083,369 A | 1/1992 | Sybatake et al. |
| 5,121,383 A | 6/1992 | Golestani |
| 5,136,582 A | 8/1992 | Firoozmand |
| 5,157,654 A | 10/1992 | Cisneros |
| 5,214,639 A | 5/1993 | Henrion |
| 5,214,642 A | 5/1993 | Kunimoto et al. |
| 5,224,099 A | 6/1993 | Corbalis et al. |
| 5,247,626 A | 9/1993 | Firoozmand |
| 5,271,002 A | 12/1993 | Barri et al. |
| 5,274,768 A | 12/1993 | Traw et al. |
| 5,278,828 A | 1/1994 | Chao |
| 5,297,137 A | 3/1994 | Ofek et al. |
| 5,303,078 A | 4/1994 | Brackett et al. |

(List continued on next page.)

FOREIGN PATENT DOCUMENTS

EP  0 706 298  9/1995

OTHER PUBLICATIONS

Shirish Sathaye; Traffic Management Specification Version 4.0; Apr. 1996; Fore Systems Inc; pp. 1–114.*

Kawahara, et al., "Performance Evaluation of Selective Cell Discard Schemes in ATM Networks," 1996 IEEE, Mar. 24, '96, p. 1054–1061.

(List continued on next page.)

*Primary Examiner*—Ajit Patel
*Assistant Examiner*—Hanh Nguyen
(74) *Attorney, Agent, or Firm*—Blakely, Sokoloff, Taylor & Zafman LLP

(57) ABSTRACT

A service controller for a cell switched network services a plurality of connection queues within the network according to a fair rate which may be weighted for each of the connection queues. Connection queues may be serviced by moving cells from one or more of the connection queues to a class of service queue and the fair rate may be computed according to the length of the class of service queue and cell arrival and departure rates to and from the class of service queue. For example, the fair rate may be computed by computing a target rate for servicing the connection queues, computing an observed arrival rate for cells arriving at the class of service queue, and computing the fair rate according to a ratio of the target rate to the observed arrival rate. The target rate may be approximated according to an amount of available bandwidth for the class of service queue and the number of cells serviced from the class of service queue in a period of time. Further, the fair rate may be periodically recomputed and doubled at each periodic recomputation. The fair rate computed for servicing cells may also be used for explicit rate control within the network.

38 Claims, 8 Drawing Sheets

U.S. PATENT DOCUMENTS

| | | | |
|---|---|---|---|
| 5,311,509 A | | 5/1994 | Heddes et al. |
| 5,313,454 A | | 5/1994 | Bustini et al. |
| 5,313,582 A | | 5/1994 | Hendel et al. |
| 5,315,707 A | | 5/1994 | Seaman et al. |
| 5,359,592 A | * | 10/1994 | Corbalis et al. ............ 370/233 |
| 5,379,297 A | | 1/1995 | Glover et al. |
| 5,404,550 A | | 4/1995 | Horst |
| 5,412,655 A | | 5/1995 | Yamada et al. |
| 5,432,908 A | | 7/1995 | Heddes et al. |
| 5,434,848 A | | 7/1995 | Chimento, Jr. et al. |
| 5,469,433 A | | 11/1995 | McAuley |
| 5,499,238 A | | 3/1996 | Shon |
| 5,502,719 A | | 3/1996 | Grant et al. |
| 5,502,833 A | | 3/1996 | Byrn et al. |
| 5,517,643 A | | 5/1996 | Davy |
| 5,528,587 A | | 6/1996 | Galand et al. |
| 5,530,698 A | | 6/1996 | Kozaki et al. |
| 5,539,899 A | | 7/1996 | Huynh et al. |
| 5,541,912 A | | 7/1996 | Choudhury et al. |
| 5,541,919 A | | 7/1996 | Yong et al. |
| 5,542,068 A | | 7/1996 | Peters |
| 5,546,389 A | | 8/1996 | Wippenbeck et al. |
| 5,548,587 A | | 8/1996 | Bailey et al. |
| 5,550,823 A | | 8/1996 | Irie et al. |
| 5,555,264 A | | 9/1996 | Sallberg et al. |
| 5,557,604 A | | 9/1996 | Usumi et al. |
| 5,557,607 A | | 9/1996 | Holden |
| 5,561,663 A | | 10/1996 | Klausmeier |
| 5,568,477 A | | 10/1996 | Galand et al. |
| 5,570,348 A | | 10/1996 | Holden |
| 5,570,360 A | | 10/1996 | Klausmeier et al. |
| 5,570,362 A | | 10/1996 | Nishimura |
| 5,600,820 A | | 2/1997 | Johnston |
| 5,617,416 A | | 4/1997 | Damien |
| 5,625,625 A | | 4/1997 | Oskouy et al. |
| 5,633,861 A | | 5/1997 | Hanson et al. |
| 5,680,582 A | | 10/1997 | Slayden |
| 5,701,495 A | * | 12/1997 | Arndt et al. ............ 710/263 |
| 5,704,047 A | | 12/1997 | Schneeberger |
| 5,742,606 A | | 4/1998 | Iliadis et al. |
| 5,742,765 A | | 4/1998 | Wong et al. |
| 5,765,032 A | * | 6/1998 | Valizadeh ............ 395/200.65 |
| 5,768,275 A | | 6/1998 | Lincoln et al. |
| 5,781,531 A | * | 7/1998 | Charny ............ 370/232 |
| 5,793,747 A | | 8/1998 | Kline |
| 5,796,735 A | | 8/1998 | Miller et al. |
| 5,812,527 A | * | 9/1998 | Kline et al. ............ 370/232 |
| 5,838,677 A | | 11/1998 | Kozaki et al. |
| 5,838,915 A | | 11/1998 | Klausmeier et al. |
| 5,844,901 A | * | 12/1998 | Holden et al. ............ 370/399 |
| 5,850,395 A | | 12/1998 | Hauser et al. |
| 5,854,911 A | | 12/1998 | Watkins |
| 5,875,352 A | | 2/1999 | Gentry et al. |
| 5,898,688 A | | 4/1999 | Norton et al. |
| 5,901,147 A | | 5/1999 | Joffe |
| 5,905,730 A | * | 5/1999 | Yang et al. ............ 370/429 |
| 5,917,822 A | * | 6/1999 | Lyles et al. ............ 370/395 |
| 5,917,828 A | | 6/1999 | Thompson |
| 5,923,656 A | * | 7/1999 | Duan et al. ............ 370/395 |
| 5,966,381 A | * | 10/1999 | Buckley et al. ............ 370/395 |
| 5,970,064 A | * | 10/1999 | Clark et al. ............ 370/351 |
| 5,974,466 A | | 10/1999 | Mizutani et al. |
| 5,978,856 A | | 11/1999 | Jones |
| 5,982,783 A | | 11/1999 | Frey et al. |
| 5,999,518 A | | 12/1999 | Nattkemper et al. |
| 5,999,533 A | | 12/1999 | Peres et al. |
| 6,011,775 A | | 1/2000 | Bonomi et al. |
| 6,028,844 A | | 2/2000 | Hao et al. |
| 6,034,945 A | | 3/2000 | Hughes et al. |
| 6,052,361 A | * | 4/2000 | Ansari et al. ............ 370/232 |
| 6,058,114 A | | 5/2000 | Sethuram et al. |
| 6,084,880 A | | 7/2000 | Bailey et al. |
| 6,101,193 A | * | 8/2000 | Ohba ............ 370/429 |
| 6,108,305 A | * | 8/2000 | Charny et al. ............ 370/232 |
| 6,130,878 A | * | 10/2000 | Charny ............ 370/230 |
| 6,201,813 B1 | | 3/2001 | Klausmeier et al. |

OTHER PUBLICATIONS

Ohba, et al., "Dynamic Threshold Control For Shared Buffer ATM Switching," Tech Rpt of IEICE, SSE–95–12, May '95.

Hashemi, et al. "A General Purpose Cell Sequencer/Scheduler for ATM Switches," IEEE, 5/97, p.29–37.

Chao, et al. "Design of Virtual Channel Queue in an ATM Terminal Adaptor," IEEE, 6/92, p.294–302.

The IPX Products Family Systems Description, pp. 1–114 (Stratacom, Inc. 1990).

BPX Multi–Service ATM Brochure (Stratacom, Inc. 1994).

B. Phillips, "Data Transmission and Switching," Data Communications, pp43–45 (McGraw Hill January 1994).

C. M. Chen and N. Roussopoulos, "The Implementation and Performance Evaulation of the ADMS Query Optimizer: Integrating Query Result Caching and Matching, " Lecture Notes in Computer Science, Advances in Database Technology–EDBT'94, pp.323–336 Cambridge, United Kingdom (March 1994).

"Mult–Access First–In–First–Out Queue Using 370 Compare and Swap," IBM Technical Disclousure Bulletin, vol. 36, No. 2, pp.327–330 (February 1993).

The ATM Forum Technical Committe, "Traffic Management Specification Version 4.0," ATM Forum document number af–tm–0056.000, April 1996.

The ATM Forum Technical Committe, "Addendum to Traffic Management V4.0 for ABR parameter negotiation, " ATM Forum doacument number af–tm–077.000, January 1997.

Hui Zhang, "Sercice Disclipline For Guaranteed Performance Service in Packet–Switching Networks," Proceedings of the IEEE, vol. 83, No. 10, pp. 1–23 (October 1995).

Jon C. R. Bennett and Hui Zhan, "Why WFQ Is Not Good Enough For Integrated Services Networks," Proceedings of NOSSDAV'96 (April 1996).

Jon C. R. Bennett and Hui Zhang, "WF2Q: Worst–case Fair Weighed Fair Queuing," Proceedings IEEE INFICIMM '96, San Francisco, CA (March 1996).

M. Shreedhar and George Varghese, "Efficient Fair Queuing using Deficit Round Robin," Proceedings of SIGCOMM '95, ACM, Cambridge, MA (1995).

* cited by examiner

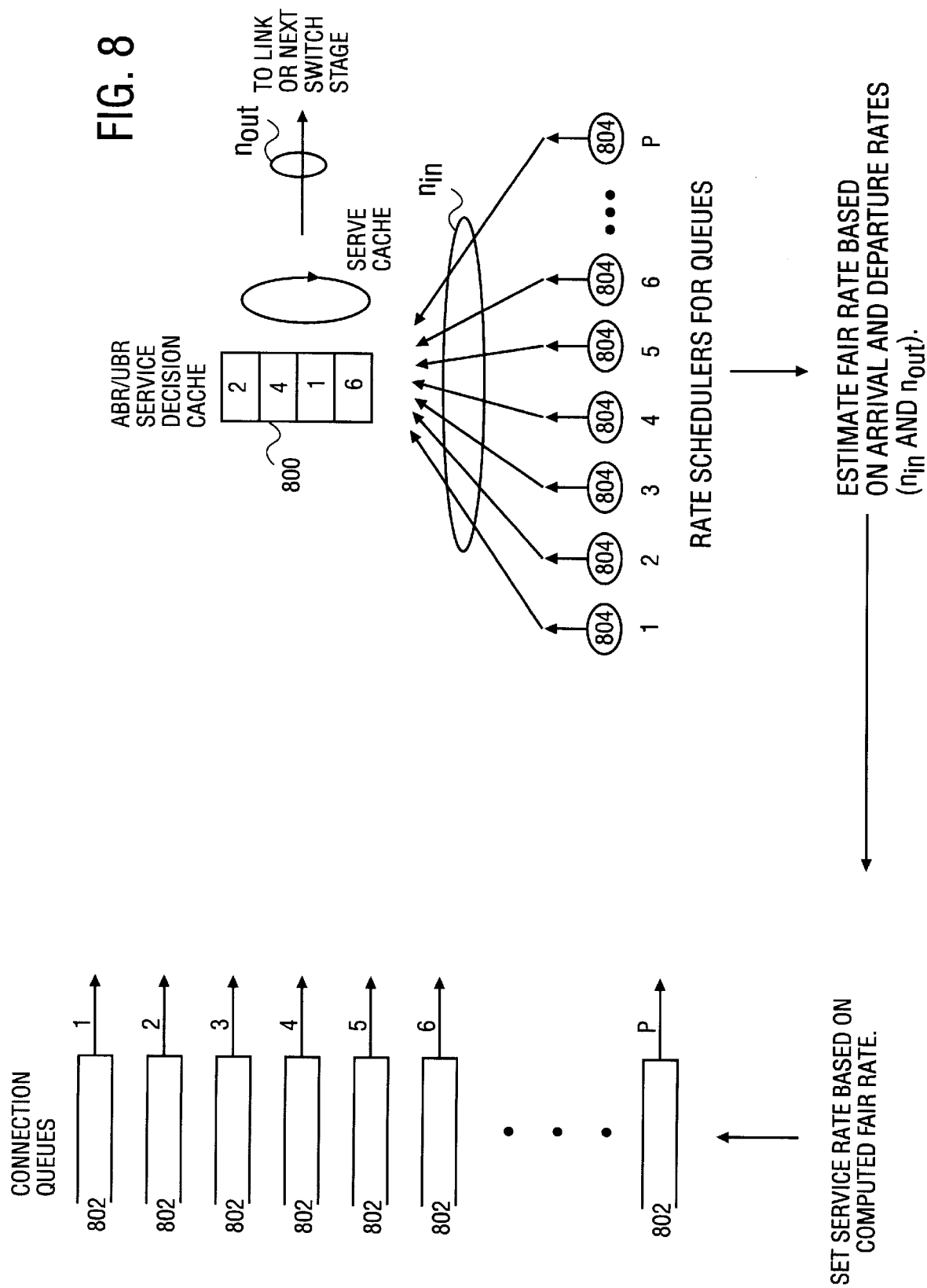

DYNAMIC RATE-BASED, WEIGHTED FAIR SCHEDULER WITH EXPLICIT RATE FEEDBACK OPTION

FIELD OF THE INVENTION

The present invention relates to a method and apparatus for handling information sent through a digital network and, more specifically, to a method and apparatus for servicing cells at a switch within such a network.

BACKGROUND OF THE INVENTION

In Asynchronous Transfer Mode (ATM) or "cell switching", digital information is segmented into equal sized units called "cells" that are transmitted from a source node to a destination node through a "connection" in a digital network. The digital network may be constructed of digital switches coupled together by digital communication links. At the destination node, the cells may be reassembled into user frames of data for presentation and/or further processing.

Within the digital network, each digital switch may be connected to many communication links. Furthermore, each communication link may carry many different connections simultaneously. Accordingly, cells belonging to each connection may need to be handled or serviced differently at each switch in order to meet overall network goals for supporting each connection.

Within each switch, a cell memory or buffer may be used for temporarily holding cells prior to transmission on a communication link. The cell memory may be arranged into logical queues. Several of such queues may be used for separating cells of different types of services and/or connections. For example, cells belonging to higher priority connections may be stored in queues that have a higher priority of service. In some cases, a separate queue may be assigned to each connection.

In such a digital switch, "servicing" of a queue may be accomplished by sending a cell of that queue out into the digital network on a communication link. In other words, the cell is removed from its associated queue and transmitted into the network. A service algorithm is employed to select a particular queue from among the number of logical queues of cells for service.

To date, however, there has not existed a means of fairly scheduling data traffic from multiple connections at a switch or other network node while at the same time providing for accurate explicit rate (ideally, per connection) feedback to upstream nodes or user end-systems.

SUMMARY OF THE INVENTION

It is an object of the invention to provide a method and apparatus for efficiently servicing cells at a node in a digital network.

It is a further object of the invention to provide a fair means of scheduling data traffic at a network node (e.g., a digital switch), with the option of providing accurate explicit rate feedback to upstream nodes or end-systems within the network.

In one embodiment, a service controller for a cell switched network may be configured to service a plurality of connection queues within the network according to a fair rate. The fair rate may be weighted for each of the connection queues. The service controller may be further configured to service the connection queues by moving cells from one or more of the connection queues to a class of service queue and the fair rate may be computed according to the length of the class of service queue and cell arrival and departure rate to and from the class of service queue.

In some embodiments, the service controller may be configured to service the connection queues at the computed fair rate, a guaranteed minimum rate or a rate which is a combination of the fair rate and the minimum rate.

In a further embodiment, cells in a digital network may be serviced by computing a fair rate for servicing the cells from a plurality of connection queues and moving the cells from the connection queues to a class of service queue according to the fair rate. Each of the connection queues may have an associated weight and each connection queue may be serviced at a rate according to the fair rate and the weight associated with the connection queue being serviced. The fair rate may be computed by computing a target rate for servicing the connection queues, computing an observed arrival rate for cells arriving at the class of service queue, and computing the fair rate according to a ratio of the target rate to their observed arrival rate. The target rate may be approximated according to an amount of available bandwidth for the class of service queue and the number of cells serviced from the class of service queue in a period of time.

In some embodiments, the fair rate may be periodically recomputed or recomputed once a predetermined number of cells have been received or have departed (e.g., based or a cell count instead of a time period). Further, the fair rate may be multiplied by a fixed constant (e.g., doubled) at each recomputation if a class of service queue empties during the period preceding the recomputation.

In yet further embodiments, cells within a digital network may be stamped with a fair rate to provide explicit rate control within said network. The fair rate used for explicit rate control may be the same fair rate computed for servicing cells from connection queues at a node within the digital network.

In still further embodiments, the present invention provides for caching service decisions for a number of a plurality of queues of cells or packets in a network; and the servicing those service decisions. Servicing the service decisions may include replacing (e.g., by overwriting) old service decisions if new service requests for any of the queues are received, otherwise the old service decisions may be reserviced.

The new service requests may be generated for each of the queues according to a fair rate or respective weighted fair rates. The fair rate and/or the weighted fair rates may be bounded by at least a minimum rate.

These and other features and advantages provided by the present invention will be apparent from the detailed description which follows and upon references to the accompanying figures described therein.

BRIEF DESCRIPTION OF THE DRAWINGS

The present invention is illustrated by way of example, and not limitation, in the figures of the accompanying drawings in which like reference numerals refer to similar elements and in which:

FIG. 8 illustrates an alternative embodiment of a dynamic, rate-based, fair scheduler according to the present invention.

DETAILED DESCRIPTION

Figure 1:
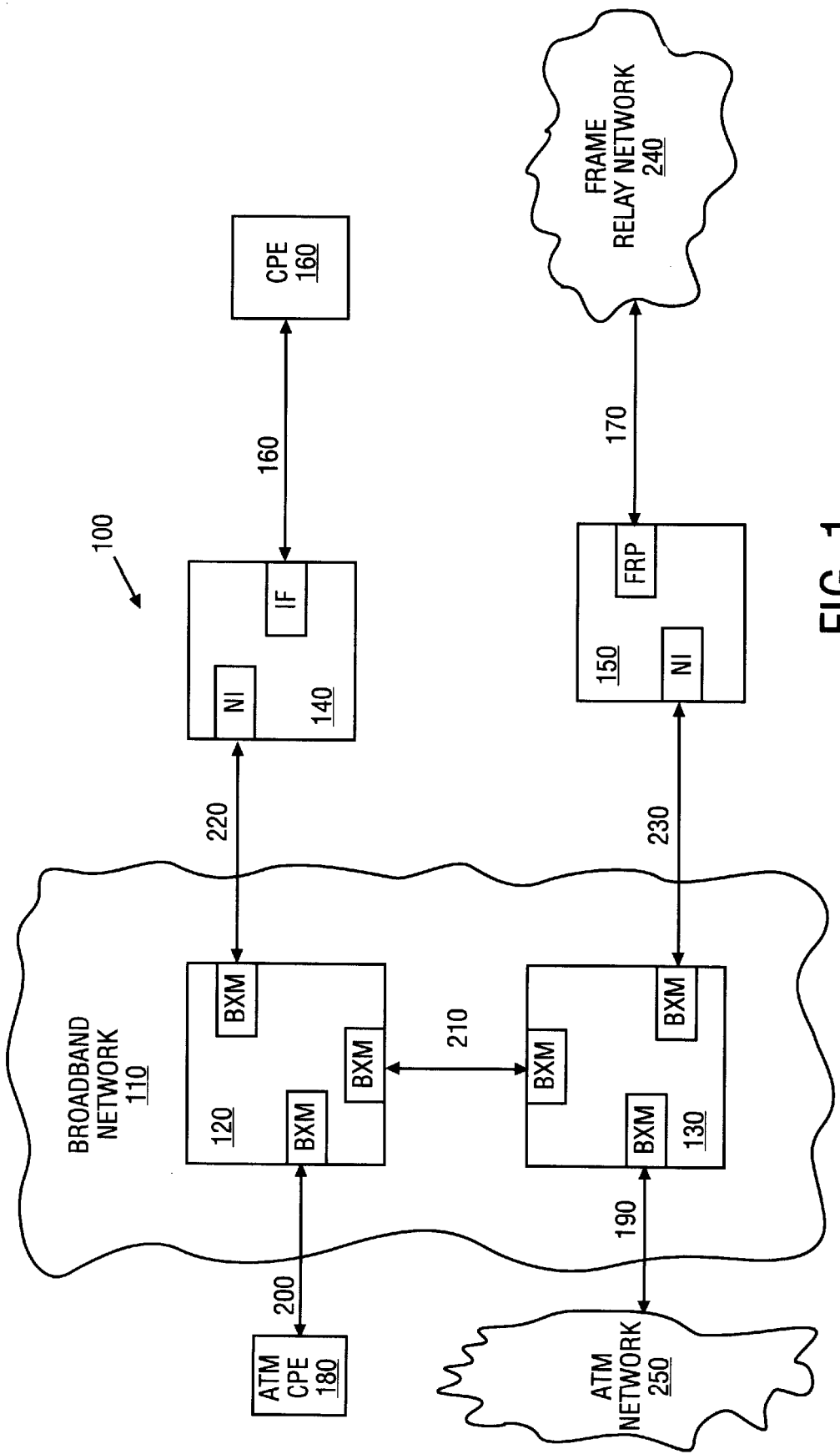
FIG. 1 illustrates a digital communication network constructed with digital switches.

In the following discussion, several methods and apparatus for implementing a dynamic, rate-based, weighted fair scheduler with optional explicit rate feedback are disclosed. For example, in one embodiment, a service controller for a cell switched network may be configured to service a plurality of connection queues within the network according to a fair rate. The fair rate may be weighted for each of the connection queues. Connection queues may be serviced by moving cells from one or more of the connection queues to a class of service queue and the fair rate may be computed according to the length of the class of service queue and cell arrival and departure rates to and from the class of service queue.

In some embodiments, the service controller may be configured to service the connection queues at the computed fair rate, a guaranteed minimum rate or a rate which is a combination of the fair rate and the minimum rate. For example, the service controller may be configured to service one or more connection queues at a rate equal to the fair rate plus a minimum cell rate. Alternatively, the service controller may be configured to service at the fair rate so long as it is greater than the minimum rate but at a rate no less than the minimum rate.

In a further embodiment, cells in a digital network may be serviced by computing a fair rate for servicing the cells from a plurality of connection queues and moving the cells from the connection queues to a class of service queue according to the fair rate. Each of the connection queues may have an associated weight and each connection queue may be serviced at a rate according to the fair rate and the weight associated with the connection queue being serviced. The fair rate may be computed by computing a target rate for servicing the connection queues, computing an observed arrival rate for cells arriving at the class of service queue, and computing the fair rate according to a ratio of the target rate to the observed arrival rate. The target rate may be approximated according to an amount of available bandwidth for the class of service queue an the number of cells serviced from the class of service queue in a period of time.

In some embodiments, the fair rate may be periodically recomputed. Alternatively, the fair rate may be recomputed after a specified number of servings/cell arrivals. Further, the fair rate may be multiplied by a fixed constant (e.g., doubled) at each recomputation if a class of service queue empties during the period preceding the recomputation. In yet further embodiments, cells within a digital network may be stamped with a fair rate to provide explicit rate control within said network. The fair rate used for explicit rate control may be the same fair rate computed for servicing cells from connection queues at a node within the digital network.

In still further embodiments, the present invention provides for caching service decisions for a number of a plurality of queues of cells or packets in a network; and the servicing those service decisions. Servicing the service decisions may include replacing (e.g., by overwriting) old service decisions if new service requests for any of the queues are received, otherwise the old service decisions may be reserviced.

The new service requests may be generated for each of the queues according to a fair rate or respective weighted fair rates. The fair rate and/or the weighted fair rates may be bounded by at least a minimum rate.

Although discussed with reference to certain illustrated embodiments, upon review of this Specification, those skilled in the art will recognize that the present invention may find application in a variety of congestion management systems. For example, although discussed primarily with reference to connections in a cell switched network, the present invention may also be utilized with Internet Protocol (IP) flows. Further, the present invention may be used in packet- (rather than cell-) based networks. Therefore, in the following description the illustrated embodiments should be regarded as exemplary only and should not be deemed to limit the scope of the present invention.

FIG. 1 illustrates a digital communications network 100. The network 100 illustrated in FIG. 1 is a cell switched digital communication network constructed of digital switches that are capable of building virtual circuits for routing cells. Switches 120 and 130 serve as the backbone for a broadband digital Wide Area Network (WAN) 110. Switches 140 and 150 couple smaller narrowband digital communication links 160 and 170 to the broadband digital network 100.

Each digital switch 120 and 130 is coupled to one or more broadband digital communication links 190, 200 and/or 210. Examples of broadband digital communication links include E3 lines, T3 lines. OC3 lines and OC12 lines. The digital switches 120 and 130 are also coupled to digital switches 140 and 150 using broadband digital communication links 220 and 230, respectively.

Each digital switch 140 and 150 in FIG. 1 is used to couple slower digital communication links 160 and 170, respectively, to the broadband digital communication network 110. Communication link 160 couples customer premise equipment 160 to switch 140. The customer premise equipment (CPE) 160 may consist of any type of digital communication equipment such a Private Branch Exchange (PBX) or a packet router. Similarly, communication link 170 couples frame relay network 240 to switch 150.

Each digital switch 120 and 130 includes one or more broadband switch modules (BXMs). The BXMs in each digital switch 120 and 130 can be used to directly connect a digital switch (e.g., digital switch 120) to any customer premise equipment (CPE) 180 that uses asynchronous transfer mode (ATM) communications and supports the proper interface. In one embodiment, an OC3 based communication link is used to carry the information. The BXMs may also support an interface which allows the digital switches 120 and 130 to be connected together (or to other networks) via one or more high speed digital communication links, e.g., link 210.

Figure 2:
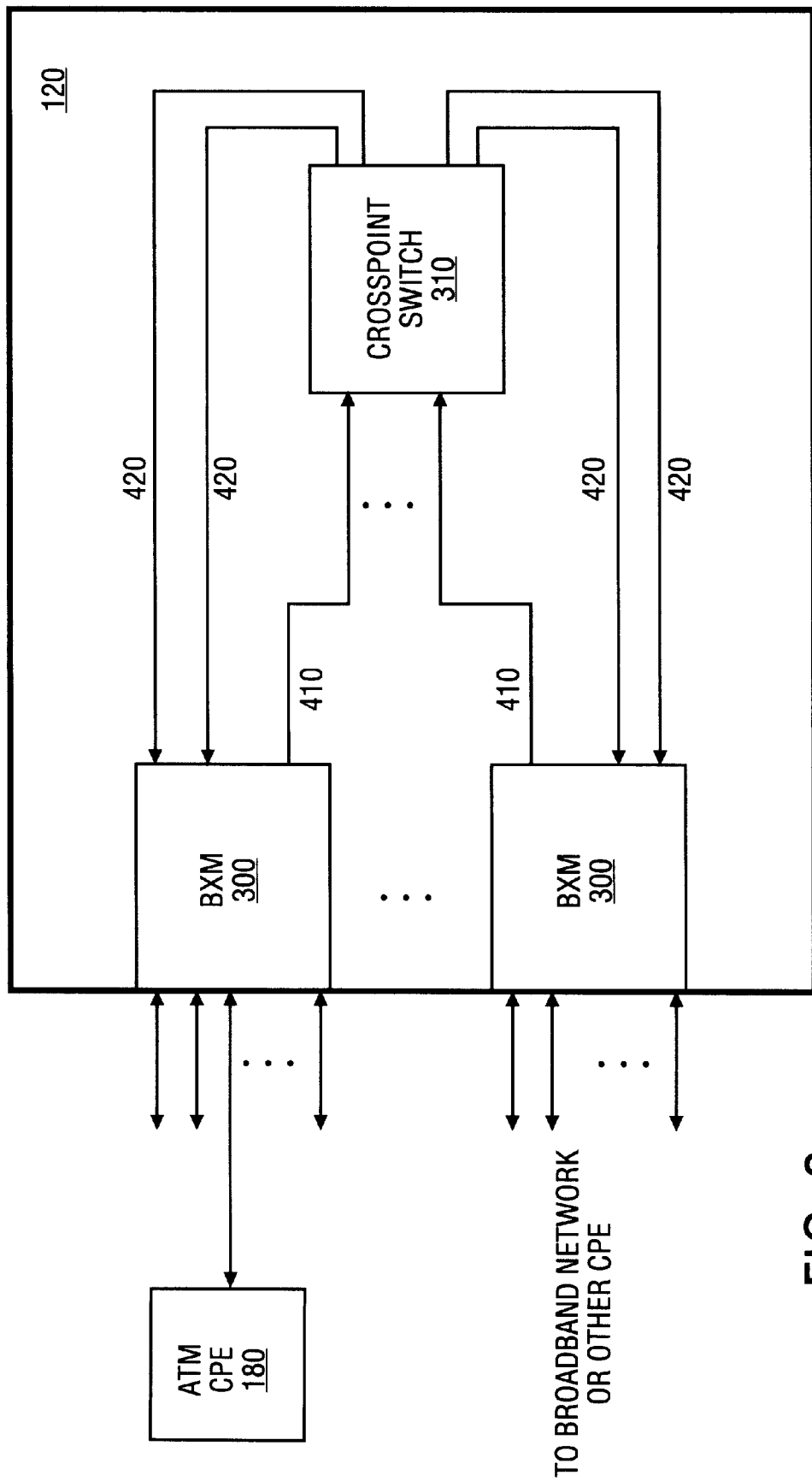
FIG. 2 illustrates an internal block diagram of a digital switch.

FIG. 2 illustrates a block diagram of the internal structure of a digital switch 120. Each digital switch 120 includes a plurality of BXMs 300 and a Crosspoint Switch 310. BXMs 300 and Crosspoint Switch 310 may each comprise one or more cards (e.g., front and back cards) which are housed within switch 120.

Each BXM 300 may include a network interface connected to a digital communication link. Every BXM 300 may also be coupled to a high-speed serial link 410 within the digital switch 120. In general, cells received from one of the digital communication links at one of the BXMs 300 are transferred from that BXM to Crosspoint Switch 310 across a high-speed link 410. Crosspoint Switch 310 then routes those cells to another BXM 300 across a high-speed link 420. Ultimately, the cells are transmitted out of switch 120 on a digital communication link coupled to the second BXM. The asymmetric design of switch 120 allows two BXMs 300 to transmit cells through Crosspoint Switch 310 to a single BXM 300 simultaneously.

Figure 3:
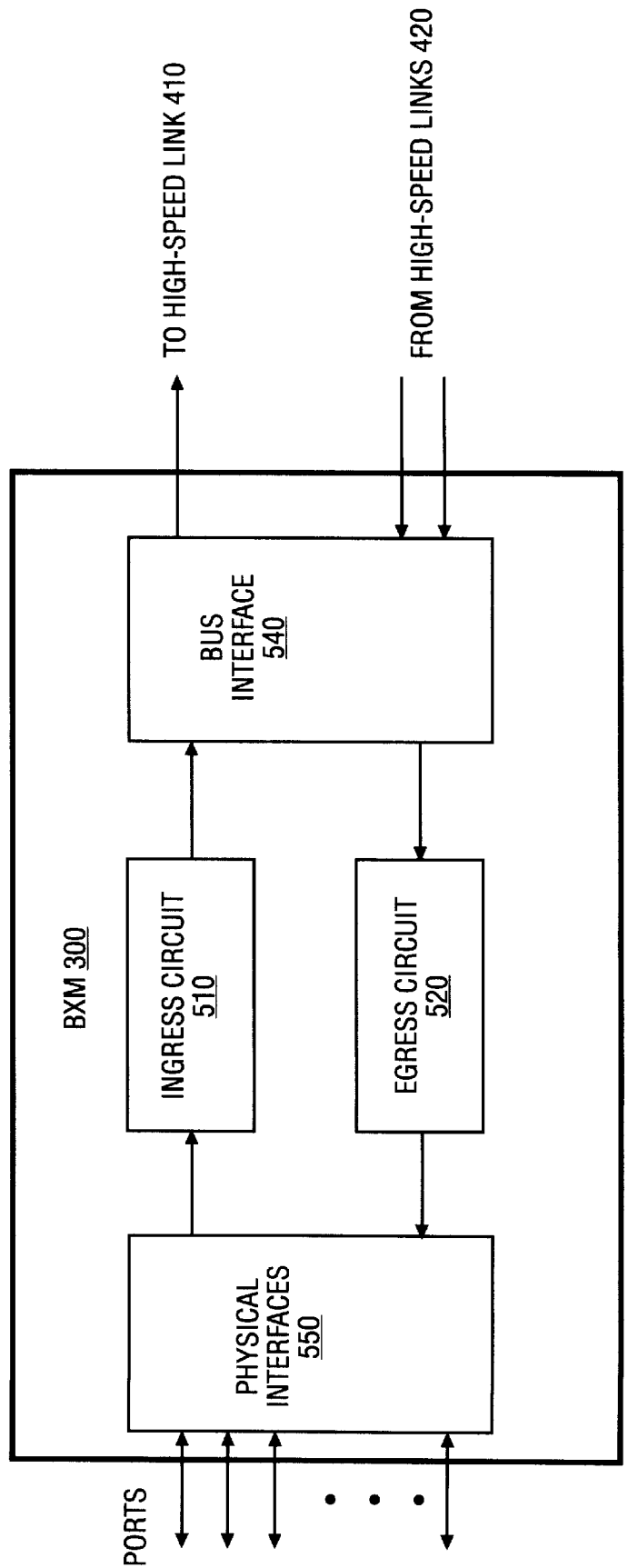
FIG. 3 illustrates an internal block diagram of a broadband switch module (BXM) of a digital switch.

FIG. 3 illustrates an internal block diagram of a BXM 300. The BXM 300 includes an ingress circuit 510, an egress circuit 520, a bus interface circuit 540 and physical interface circuits 550. The ingress circuit 510 processes incoming cells received from one of the digital communications links through physical interface circuit 550. The egress circuit 520 processes outgoing data cells received from bus interface circuit 540. Ingress circuit 510 and egress circuit 520 may be substantially similar in design. The bus interface circuit 540 is coupled to both the ingress circuit 510 and the egress circuit 520 and distributes data cells to and from the high speed links 410 and 420 within the digital switch 120. The physical interface circuit 550 is also coupled to the ingress circuit 510 and the egress circuit 520 and distributes cells to and from the digital communication links coupled to the physical interface circuit 550 through one or more ports. In one embodiment, a BXM 300 is capable of receiving cells from high speed links 420 at a rate of 2×OC12. That is, bus interface circuit 540 is capable of receiving cells from each of two high speed links 420 at a rate of OC12. Cells may be transmitted to a high speed link 410 or a port at a rate of 1×OC12.

As will become apparent, as cells are received at switch 120, they are organized into logical queues depending on their associated connections or classes of service. Later, the cells are transmitted out of switch 120, generally according to the demands of their associated classes of service. The receive and transmit interfaces to switch 120 present potential points of congestion for the cells. For example, ingress circuit 510 has two receive interfaces and only one transmit interface. Thus, congestion may occur if cells are received on both of the receive interfaces and are to be transmitted on the single transmit interface. Likewise, egress circuit 520 has two receive interfaces and a single transmit interface and congestion may result if cells received on the two receive interfaces compete for the single transmit interface. The use of logical queues at these interfaces (as described in detail below) helps to avoid cell loss when congestion occurs at these points.

To properly manage the logical queues, a number of accounting records for each interface, connection and class of service are maintained at switch 120. For example, for each interface, records which track the total number of cells stored in memory for that interface are maintained. Such records (along with associated cell maximum thresholds for each interface) allow for control over the number of cells stored in memory per interface, thus preventing a single interface from monopolizing the memory resources of switch 120. Likewise, records regarding the total number of cells stored for each class of service or connection from monopolizing the memory resources of switch 120 (and for limiting cell transfer delay in the case of classes of service). Threshold values including maximum cell counts, CLP (cell loss priority) thresholds, EPD (early packet discard) thresholds, and EFCI (explicit forward congestion indicator) thresholds are maintained for each class of service and connection. These thresholds are used in the conventional fashion and allow circuitry within switch 120 to make decisions regarding whether or not to accept new cells for a given connection or class of service. In general, cell admission policies may be based on a comparison of the number of cells of a given connection or class of service (or the total number of cells) already stored in memory at switch 120 with a preestablished threshold. Any or all of these thresholds may be dynamically scaled as memory resources become filled in order to further prevent to possibility of congestion. A related U.S. Pat. No. 6,034,934, entitled Method and Apparatus for Per Traffic Flow Buffer Management, by David A. Hughes and Daniel E. Klausmeier and assigned to the Assignee of the present invention discusses such dynamic scaling techniques.

The logical queues may be organized into groups, which (for egress circuit 520) may correspond to virtual interfaces (VIs) as described in a related U.S. patent application Ser. No. 08/885,400, entitled Multi-Stage Queuing Discipline, filed Jun. 30, 1997, by Daniel E. Klausmeier et al., and assigned to the Assignee of the present invention. In one embodiment, 32 VIs are supported, each with 16 logical queues. Each VI corresponds to a physical interface, i.e., a communication link, leaving the switch 120. Using the VIs, switch 120 can rate limit the traffic for each of the downstream physical interfaces so that contention is avoided. A service algorithm will first choose a VI to service and then select a logical queue from the chosen VI.

Figure 4:
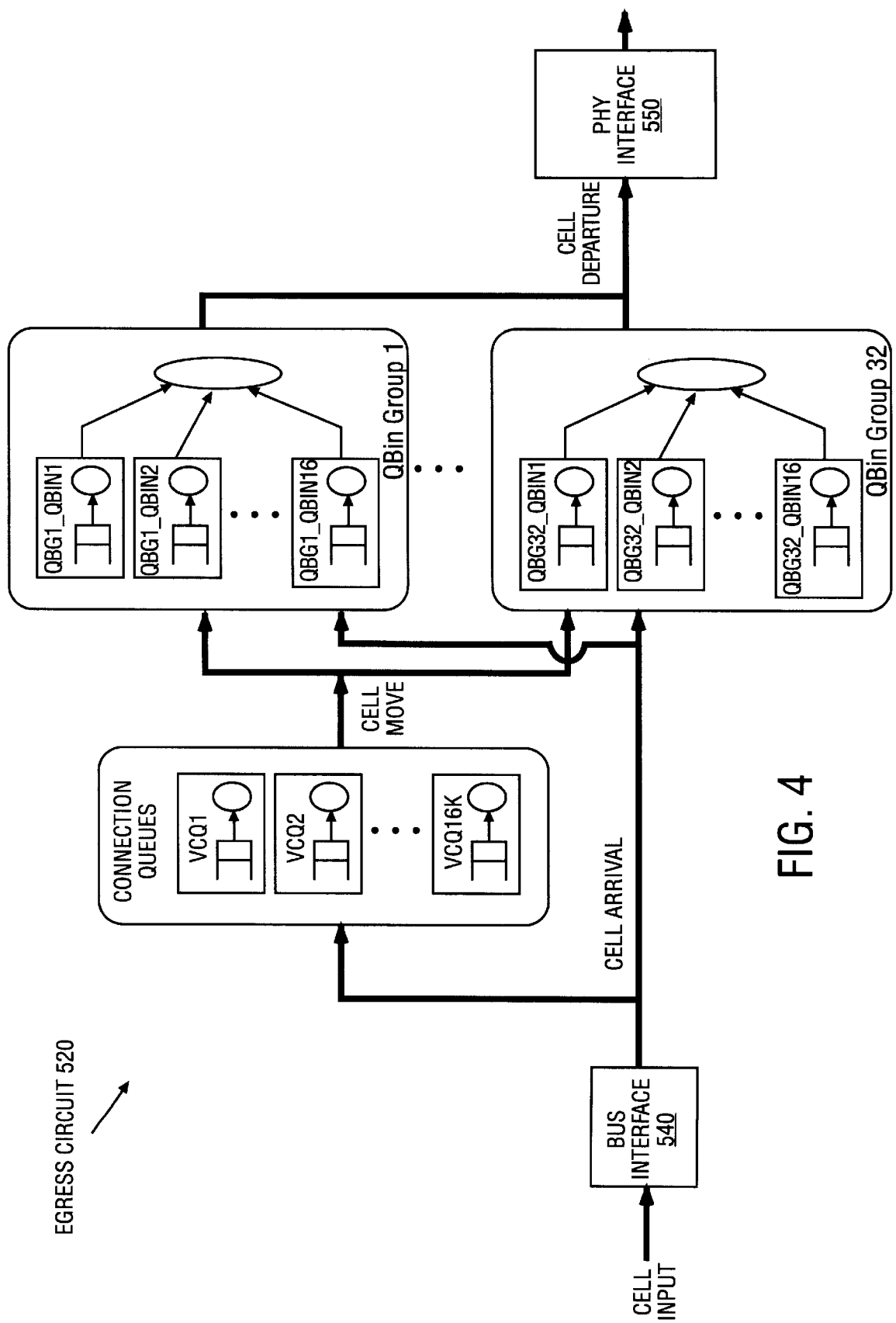
FIG. 4 is a functional representation of an egress circuit of a broadband switch module (BXM)

FIG. 4 illustrates the functional components of egress circuit 520. Hereafter, the description is generally directed to egress circuit 520, however, it should be appreciated that ingress circuit 510 is substantially similar. For egress circuit 520, cells are received from bus interface circuit 540 and are passed to an ATM communication link through one or more ports of physical interface 550.

For egress circuit 520, incoming cells are placed into a queue in a cell memory until the cell is serviced. Egress circuit 520 maintains various cell queues, including VC queues that correspond to individual connections and QBin queues that correspond to various classes of service. These queues may be implemented through special memory components, such as FIFOs. However, such an implementation would be expensive and inflexible. For example, a cell memory that supports a thousand connections would require a thousand separate queue-implementing memory components for just the VC queues. Furthermore, it would be difficult for VC queues that correspond to connections with heavy traffic to "borrow" memory from VC queues that corresponds to connections with light or no traffic. Consequently, the present embodiment stores incoming cells in separate dynamic random access memory (DRAM), and implements the various queues through the use of linked lists.

The manner in which such linked list queues are implemented and controlled is discussed in detail in a related U.S. patent application Ser. No. 08/889,999, entitled "Method and Apparatus for Maximizing Memory Throughput", filed Jun. 30, 1997 by Daniel E. Klausmeier and Kevin Wong and assigned to the Assignee of the present invention. Briefly, as cells are received at egress circuit 520, they are temporarily stored in a cell memory prior to transmission on one of the outgoing communication links. A linked list data base is used to keep track of the location and sequence of the cells in the cell memory. That is, a series of "next entry" pointers are established such that each sequence of entries are linked together. Each connection and class of service supported by switch 120 has a corresponding linked list queue (VC queue or QBin queue, respectively) and a queue manager maintains the links in each of the queues so that the entries (i.e., pointers) in the linked lists are updated to reflect cell arrivals (to the tail of a VC queue or a QBin queue), cell moves (from the head of a VC queue to the tail of a QBin queue) and all departures (from the head of a QBin queue).

VC queues may be implemented to support ABR and UBR traffic according to various specifications adopted and proposed by the ATM Forum. For example, ABR VSVD (virtual source virtual destination) connections (as defined in the ATM Forum's "Traffic Management Specification v4.0", March 1996, and its later revisions), may have cells enqueued in a VC queue initially and then moved to a QBin queue for servicing at a rate depending upon the dynamic of the available network bandwidth. Other network traffic may be received directly into QBin queues for servicing.

The QBins are organized as QBin Groups (QBGs). Each QBG is made up of a number of QBins, each with its own associated service priority. A Queue Controller, which includes selection logic, selects the next eligible QBG and QBin for service based on service eligibility and service priorities. This selection process is described in detail in U.S. patent application Ser. No. 08/885,400, entitled Multi-Stage Queuing Discipline, filed Jun. 30, 1997, by Daniel E. Klausmeier et al.

As indicated above, some cells are enqueued in VC queues prior to being moved to QBins for servicing. A Service Controller determines when cells will be moved from a VC queue to a QBin. To accomplish this task, the Service Controller transmits a signal to the Queue Controller to indicate that a cell should be moved. The signal identifies the source VC queue which is subsequently mapped to an appropriate destination QBin. In response, the Queue Controller updates the linked lists so that the pointers which indicate the memory location of a cell being moved are removed from the head of the designated VC queue and are added to the tail of the appropriate QBin queue. In accordance with the present invention, the service controller implements a dynamic, rate-based fair scheduling algorithm to determine when cells should be moved from VC queues to QBins. The scheduling algorithm may be tailored to provided "weighted" fair queuing among VC queues and the "fair rate" determined for servicing the VC queues may further be used for explicit rate feedback to upstream nodes or end-systems as will be discussed in detail below.

Figure 5:
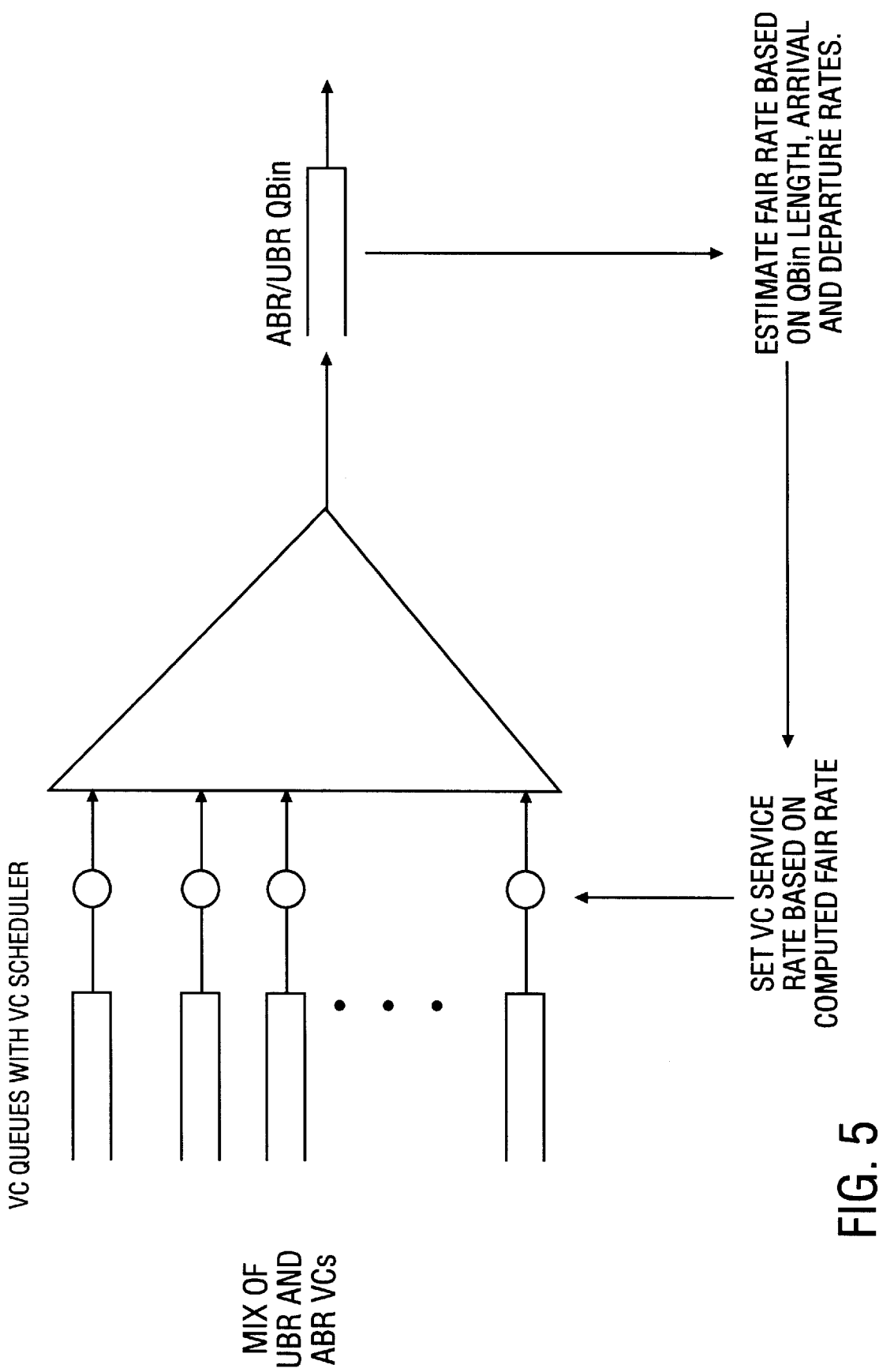
FIG. 5 is a functional representation of a dynamic, rate-based, fair scheduler according to one embodiment of the present invention.

Before describing the fair rare scheduling methodology of the present invention in detail, it is helpful to present a functional description of the process. FIG. 5 is a functional representation of a dynamic, rate-based, fair scheduler according to one embodiment of the present invention. As discussed above, separate queues are assigned to each user (or connection). These per connection or VC queues can then be serviced in a fair manner, for example, by round-robin. Round-robin servicing achieves an equal allocation of bandwidth to all sources (i.e., all VCs queues associated with a particular QBin).

Weighted fair queuing is a generalization of this concept which allows each connection to be assigned a weight, where each weight determines what proportion of available bandwidth an associated connection receives. In the past, per-connection queuing has been implemented, however, connection rates have been controlled by feedback from other network nodes rather than by local scheduling. Weighted fair queuing is a local scheduling methodology that is used to force fair allocation of bandwidth to connections sharing the same QBin.

There are many possible implementation strategies, each of which approximates the above definition of fair queuing. One implementation, as shown in FIG. 5, uses a rate scheduler and a rate adjustment algorithm. The service controller is used to schedule connections (VCs) into an associated QBin at a controlled rate. To implement fair queuing, all connections belonging to the same QBin are scheduled at this same "fair rate". To implement weighted fair queuing, within a QBin, the "fair rate" is multiplied by a "per VC weight". The "fair rate" for a QBin is determined in real-time, based on that QBin's arrival and service rate, using a suitable algorithm. An exemplary algorithm which computes a "fair rate" based on QBin length and cell arrival and departure rates is discussed below.

Figure 6:
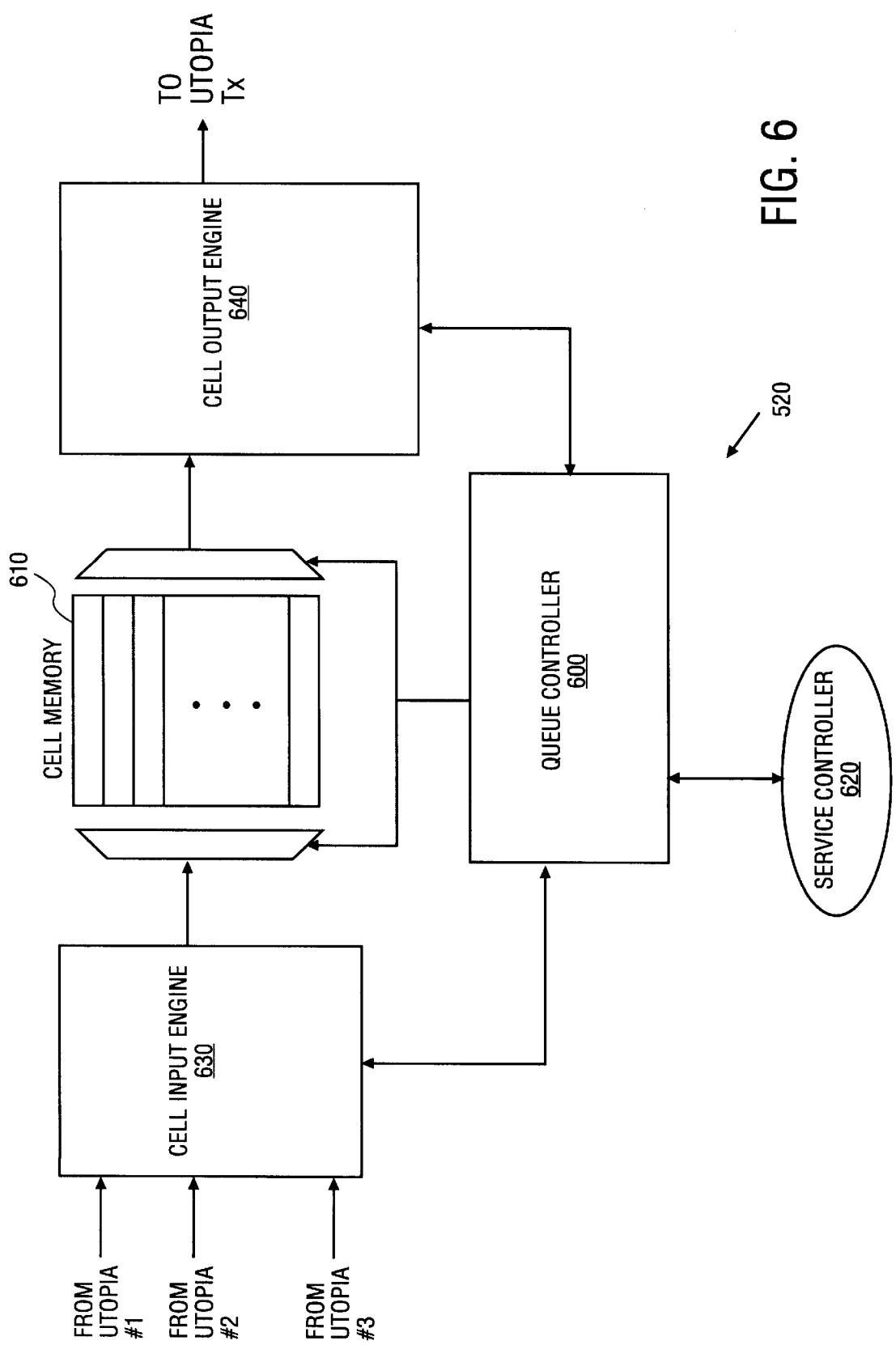
FIG. 6 illustrates a structural diagram of the egress circuit shown in FIG. 4.

FIG. 6 illustrates a block diagram of the structure of egress circuit 520 according to one embodiment of the present invention. Egress circuit 520 includes queue controller 600, service controller 620, cell input engine 630 and cell output engine 640. Also shown in FIG. 6 is cell memory 610 which is used to store the actual cells (and which is preferably an off-chip memory such as a DRAM). Queue controller 600 also maintains various data structures (e.g., in on-chip registers and/or on- or off-chip memories) such as configurations, state information and statistics for each VC supported by switch 120. Among these are the QBin group number (QBG#) that a VC will be mapped to; the QBin number (QBin#) for the QBin group of interest; the discard state (used for frame-based discard) of the VC received; the current cell count for the number of cells stored in the cell memory 610 that correspond to the VC of interest; the new GFC, VPI and VCI fields for departing cells along with translate enable values for these fields; and a number of threshold values. The threshold values include cell count thresholds for the maximum number of cells allowed in cell memory 610; CLP (cell loss priority) thresholds, EPD (early packet discard) thresholds, and EFCI (explicit forward congestion indicator) thresholds.

Cell input engine (CIE) 630 acts as a Utopia-2 master to receive incoming cells over one of its three Utopia-2 receive interfaces. Each Utopia-2 receive interface may be associated with a number of ATM communication links (in the case of ingress circuit 510) or with the high-speed links 420 (in the case of egress circuit 520). In either case, port or bus interface circuits (not shown) which comply with the well known Utopia-2 standard for carrying ATM cells between devices provide the cells to each of the Utopia-2 receive interfaces. CIE 630 may store the received cells in internal queues before converting the 16-bit Utopia-2 data into 64-bit data for storage in cell memory 610. After CIE 802 receives a cell, it extracts the cell's connection, source and other information, and presents the information to queue controller 600 for processing.

Upon receipt of the cell information provided by CIE 802, queue controller 600 checks the relevant cell count threshold to determine whether the newly arriving cell can be accommodated in the cell memory 610. If not, the cell is discarded. If space is available for the arriving cell, queue controller 600 obtains cell count threshold information for the corresponding QBin group and determines whether the QBin group threshold would be exceeded by adding the newly arriving cell. If the threshold would be exceeded, the cell is discarded. Otherwise, queue controller 600 obtains the cell count and other threshold information for the VC associated with the arriving cell. These thresholds are checked to determine whether the cell will be accepted. If the VC is already storing its maximum number of allowed cells (as determined by the cell count and threshold values), the new arriving cell is discarded. Assuming, however, that the cell is accepted, queue controller 600 increments the VC connection statistics and the VC and QBin group cell counts associated with the arriving cell and also increments the global cell count value which represents the total number of cells stored in cell memory 610. If the cell is to be queued directly to a QBin and not a VC, then queue controller 600 obtains the appropriate QBin and QBin group cell counts and thresholds and these values are used to determine whether the newly arriving cell may be accepted or not. If the cell is accepted, queue controller 600 increments the associated QBin and QBin group cell counts.

For cells that are accepted, queue controller 600 examines the information provided by CIE 630 and determines where to store the cell in cell memory 610. This storage location is linked to the tail of the appropriate queue (VC queue or QBin queue). Ultimately, the cell is stored to cell memory 610 from CIE 630 under the control of queue controller 600.

The cell departure process involves the use of cell output engine (COE) 640. Cells depart from QBins and queue controller 600 is responsible for selecting a QBin for service. The details of the service selection process are set forth in U.S. patent application Ser. No. 08/885,400, entitled Multi-Stage Queuing Discipline, filed Jun. 30, 1997, by Daniel E. Klausmeier et al. and once a QBin has been selected for service, queue controller 600 finds the cell memory 610 location of the cell at the head of the selected QBin and the cell at the designated storage location is read out of cell memory 610 to COE 640.

Connection information from the departing cell is extracted and provided to queue controller 600 which uses this information to retrieve and update the VC queue and QBin queue statistics and cell counts. Queue controller 600 also provides COE 640 with VCI, VPI, and EFCI update information for the departing cell. When appropriate, COE 640 transmits a cell on its Utopia transmit interface.

In addition to cell arrivals and departures, egress circuit 520 also handles cell moves from the head of a VC queue to the tail of an associated QBin queue. Cells are moved according to information provided by service controller 620 which schedules move events according to the above described service algorithm. The move information is provided to queue controller 600. When queue controller 600 receives the move information, it accesses a VC state table to obtain the target QBin queue for the designated VC queue. Queue controller 600 then dequeues the cell at the head of the designated VC queue and enqueues this cell at the tail of the target QBin queue. The detailed of the memory operations which are used to accomplish this move event are set forth in related application Ser. No. 08/884,999, filed Jun. 30, 1997, by Daniel E. Klausmeier and Kevin Wong and entitled "Method and Apparatus for Maximizing Memory Throughput".

If the source VC queue for the move was empty, queue controller 600 recognizes the condition and the VC queue and target QBin queue are not modified. If the source VC queue was not empty, the VC queue and target QBin queue are modified as indicated above and, and in addition, queue controller 600 updates the appropriate QBin cell count and statistics. The move status is also reported to service controller 620.

Figure 7:
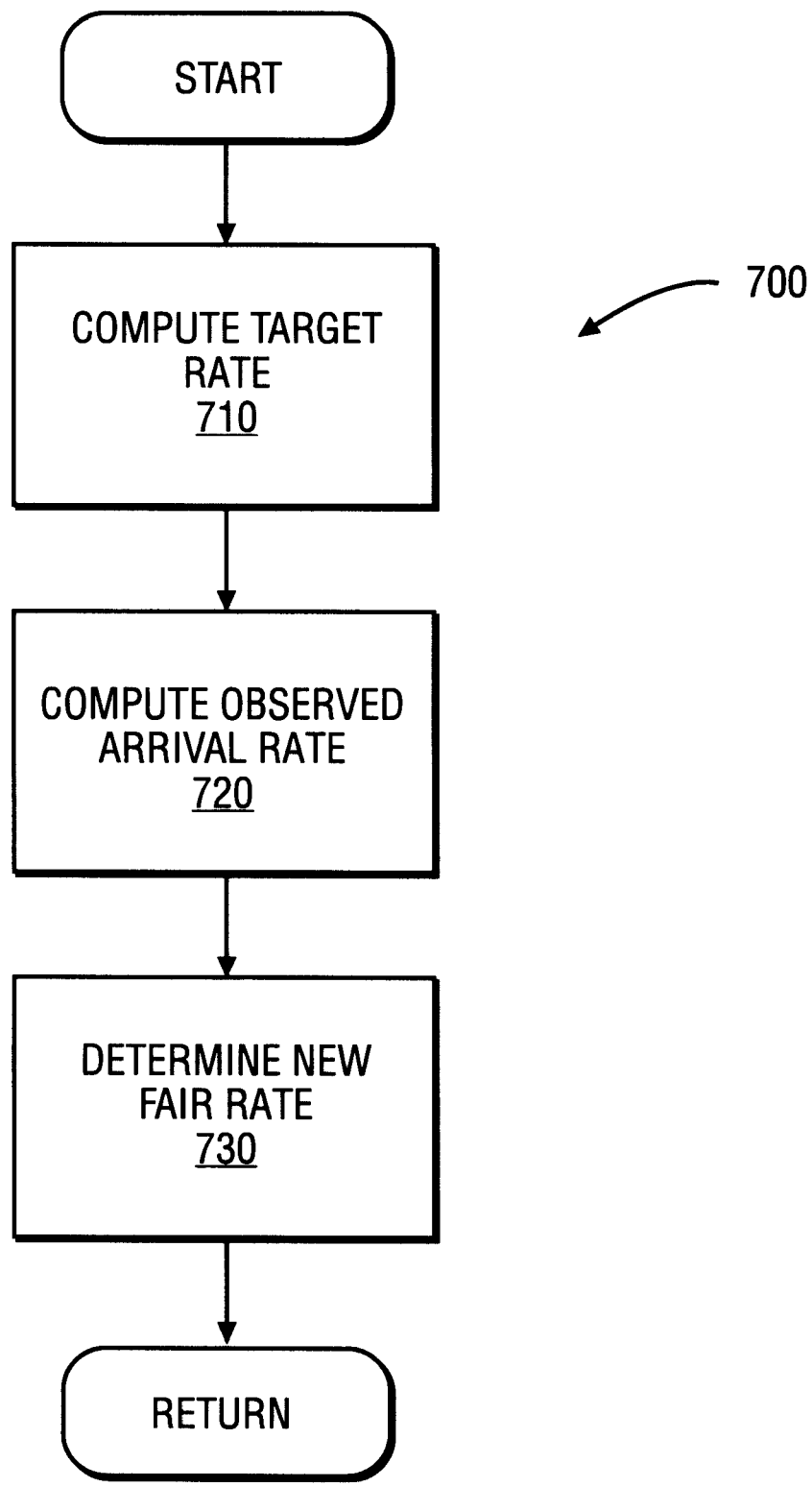
FIG. 7 is a flow diagram illustrating a process for computing a fair rate for servicing cells at a node in a digital network according to one embodiment of the present invention.

To control the cell move events, service controller 620 computes the "fair rate" for servicing VC queues belonging to each QBin. FIG. 7 illustrates an exemplary algorithm 700 for calculating this "fair rate". The basic principle is to compute a target rate (step 710), compute the observed arrival rate (step 720) and then determine a new fair rate (step 730) by multiplying the old fair rate by a ratio of the target rate to the observed rate. To control QBin length (i.e., the number of cells in a QBin) and to improve performance at low rates, some "tweaks" are introduced, as discussed below. Once the fair rate is computed, the VC queues may be serviced in a round robin fashion according to the fair rate or the VC queues may be serviced according to a weighted approach where each VC queue is assigned a "weight" and is serviced at a rate according to the product of the computed fair rate and the VC weight.

The exemplary algorithm for calculating the fair rate uses the following inputs (each of which may be obtained from the above-described statistics maintained by queue controller 600:

$c_{in}$ (the count of cells arrived into a QBin);

$c_{out}$ (the count of cells serviced from a QBin);

$c_{av}$ (count of available cell slots in a QBin, this may also be thought of as the unused bandwidth of a QBin and is an optional parameter);

$q_{len}$ (the current QBin length, i.e., the number of cells currently stored in a QBin); and In addition to these inputs, the algorithm uses several constants;

T (the algorithm period which may be varied, e.g., from 0.5 msec to 16 msec, faster is better);

$n_{min}$ (the minimum number of cell arrivals per adjustment, e.g., 5–20);

round up factor (the amount to round up, e.g., 1.05–1.5);

round down factor (the amount to round down, e.g., 0.5–0.95);

thresh (the target QBin length, e.g., 500–2000 cells); and min_rate (the absolute minimum value for the fair rate which is required to be non-zero, e.g., 10 cells per second)

Using the above parameters and constants, the fair rate may be computed as follows:

```
n_in = n_in + (c_in—last))
n_out = n_out + (c_out - c_out—last)
n_av = n_av + (c_av - c_av—last)
if n_in > n_min  % if there are a minimum number of cells to obtain a valid
                    measurement
    R = ((n_out + n_av)/n_in
        R = min(R, 1/K)      % where K = a fixed constant, e.g., 4
        R = max(R, L)        % where L = a fixed constant, e.g., 4
    fair_rate = fair_rate * R
    if q_len > thresh
        round up fair_rate
    else
        round down fair_rate
    fair_rate = min(fair_rate, min_rate)
    fair_rate = max(fair_rate, link_rate)
    % program hardware with fair_rate
    n_in = 0; n_out = n_av = 0
end
c_in—last = c_in
c_out—last = c_out
c_av—last = c_av
```

In this integer counter-based description, time is normalized out of the algorithm. Effectively, $n_{in}$ represents the cell arrival rate to a QBin and ($n_{out}+n_{in}$) represents the target rate for the QBin. If the number of available (empty) slots is not possible to derive from the hardware, then the algorithm can be modified by computing the fair rate as follows:

```
if q_len > 0
    R = (n_out/n_in)
        R = max(R, K)        % where K = a fixed constant, e.g., 4
        R = min(R, 1/L)      % where L = a fixed constant, e.g., 4
    fair_rate = fair_rate * R
else
    fair-rate = fair_rate * C   % where C = a fixed constant, e.g., 2
    end
```

The idea here is that if the queue is non-empty, then $n_{out}$ is a fair estimate of the target rate. This assumes that the queue has not been empty during the period T. On the other hand, if the queue is empty, the algorithm assumes that the service rate can be increased, e.g., to twice the previous rate, as an estimate. If this is too much, the service rate will be adjusted back to the right value in the next T step. If it is too little, it may take several T steps to get fair_rate up to appropriate level. The estimate for doubling the service rate is simply a compromise between not being overly aggressive (doubling the service rate is well within the typical limits of the algorithm) and ramping up quickly if there is lots of bandwidth. Other estimates (e.g., tripling the service rate if the queue is empty between samples) may be useful for other implementations.

The above exemplary algorithm (which may of course be implemented in hardware or software depending on the configuration of service controller 620) has several attractive properties. For example, it has a very fast transient response. That is, the algorithm converges directly to the correct service rate in a single step (unless $n_{av}$ information is unavailable, in which case it takes a few steps to increase the fair-rate significantly). The transient response is slower when scheduled rates drop below 1/T, because it takes several T to get a valid measurement of the input rate. Also, the algorithm allows very good buffer control. Because of the fast response time QBin length is controlled very effectively. The smaller the step T is, the better the buffer control. In addition, full utilization of the link is achieved. Because buffer control is tight, the algorithm is able to maintain full utilization of the link even as traffic patterns (number of active VCs) change. Further, the algorithm is insensitive to rounding errors and coarse scheduler granularity. It works very well even when the scheduler has an error due to granularity of order U±50%. Consequently, the entire algorithm can be implemented in low precision arithmetic. As shown above, typical range of the fair rate adjustment ratio (($n_{out}+n_{av}$) / $n_{in}$) is from 1/4 to 4. The algorithm works well even with bounds on this ratio as tight as 1/2 to 2 or as loose as 1/8 to 8.

The concept to weighted fair queuing can now be extended to explicit rate control. Explicit rate (ER) control allows calculation of the fair "bottleneck" rate for a port and "stamps" this rate into all cells (e.g., in a header field of the cells), optionally adjusted by a weight, with an ER exceeding the fair value. In this case, the optimal value to "stamp" into the cells is the same fair rate calculated above. Thus, implementing weighted fair queuing allows calculation of the fair-rate, which could be used as the stamp for this explicit rate control. The use of an ER field in ATM cells is explained in the ATM Forum's "Traffic Management Specification v4.0", March 1996, and its later revisions. This discussion, however, leaves open the manner in which to compute the ER, for which the present invention provides a useful implementation. Thus, the computation of a fair rate in the manner described above allows for fair scheduling, rate scheduling and explicit rate control in one integrated function.

An alternative embodiment of the present invention is illustrated in FIG. 8. In this embodiment, a service decision cache 800 is used to store service decisions for a plurality of queues 802. The cache 800 is served (e.g., in a round robin fashion) and cells from the queues are passed to a link associated therewith or to a next stage in a digital switch. More particularly, rather than moving cells from queues 802 to a further queue (as was the case for the embodiment illustrated in FIG. 5), this embodiment of the present invention stores cells in queues 802 until they are selected for servicing. When so selected, the cells are moved directly from their respective queue 802 to an outgoing link or to a next stage in the switch.

To accomplish this task, service decisions are stored in service decision cache 800. To bound the delay experienced by sources transmitting at less than their fair rate, there may be far fewer service decision cache entries than VC queues. For example, where 60,000 queues are to be served (i.e., p=60,000), service decision cache 800 may have sufficient size to store only four service decisions at any one time. Of course, other configurations and sizes for service decision cache 800 may also be used.

Service decisions for individual queues 802 are stored in service decision cache 800 according to service requests issued by rate schedulers 804. Each queue 802 has an associated rate scheduler 804 which operates to issue service requests for storage in service decision cache 800 at a service rate which is set according to the computed fair rate or a weighted fair rate. The fair rate may be computed as discussed above.

Service decisions stored in the service decision cache 800 may be served in a round robin or other fashion (e.g., a priority-based fashion). When so serviced, cells from the appropriate queue are moved to the link or the next switch stage. After a service decision has been served, it may be suitably marked (e.g., using a served/not served bit or other scheme), however, it is not removed from the service decision cache 800. Instead, the previous service decisions remain in the service decision cache 800 where they may be replaced (e.g., by being overwritten) with new service requests from the rate schedulers 804 if any such new requests are received. If no new request is received, the old (i.e., previously served) service request in service decision cache 800 are served again. This re-servicing ensures that the maximum available bandwidth for the link or next switch stage is used. This scheme can be described as follows:

| | |
|---|---|
| if $n_{in} > n_{out}$, | then either overwrite an old service decision or drop new service decisions in service decision cache 800 after they have been serviced (but do not drop any cells); |
| otherwise | |
| if $n_{out} > n_{in}$ | then reuse service decisions in the service decision cache 800. |

For the example shown in FIG. 8, a total of p queues 802 are served by a four-position service decision cache 800. Service requests for queues 2, 4, 1 and 6 are pending in service decision cache 800. Each of these service decisions may be served in a round robin (or other) fashion and, as they are so served, cells from the corresponding queues (2,4, 1 and 6) 802 are moved to the link or next switch stage. If each of the pending service decisions are served with no new service requests being received, these same service decisions will be reused (or reserved) and cells from the corresponding queues will be moved. This will continue until new service requests are received from the rate schedulers 804. The new service requests will replace the old service decisions in cache 800 and will then be served in turn. The service rates for the individual queues 802, i.e., the rates at which the rate schedulers 804 will issue service requests for their corresponding queues, can be computed based on the arrival and departure rates, $n_{in}$ and $n_{out}$ respectively, of service requests/decisions to/from the cache 800 which are used to estimate the fair rate as discussed above.

Thus a dynamic, rate-based, weighted fair scheduler with explicit rate feedback has been described. Although certain preferred embodiments have been discussed and illustrated, it should be appreciated that these discussions and illustrations are exemplary only. Accordingly, the present invention should be measured only in terms of the claims which follows.

What is claimed is:

1. A method of servicing cells or packets in a digital network, comprising:

computing a fair rate for servicing said cells or packets from a plurality of connection queues according to a ratio of a target rate for servicing said connection queues to an observed cell arrival rate at a downstream queue in said network; and servicing said cells or packets from said connection queues according to said fair rate.

2. The method of claim 1 wherein each of said connection queues has an associated weight and each connection queue is serviced at a rate according to said fair rate and the weight associated with the connection queue being serviced.

3. The method of claim 1 wherein said fair rate is bounded by a minimum rate and a maximum rate.

4. The method of claim 1 wherein each of said connection queues has an associated weight and each connection queue is serviced at a rate according to said fair rate and the weight associated with the connection queue being serviced, said fair rate being bounded by at least a minimum rate.

5. The method of claim 1 wherein said target rate is approximated according to an amount of available bandwidth for said downstream queue and the number of cells serviced from said downstream queue in a period of time.

6. The method of claim 5 wherein said fair rate is bounded by at least a minimum rate.

7. The method of claim 1 wherein said fair rate is periodically recomputed.

8. The method of claim 7 wherein said fair rate is multiplied by a fixed constant at each periodic recomputation if said downstream queue empties during the period preceding the recomputation.

9. The method of claim 1 wherein said fair rate is recomputed after a number of cell arrivals or services.

10. The method of claim 1 further comprising stamping cells within said digital network with said fair rate to provide explicit rate control within said network.

11. A method, comprising:

storing service decisions for a number of plurality of queues of cells or packets in a network; and replacing said service decisions if new service requests for any of said queues are received, wherein said new service requests are generated for each of said queues based on a fair rate set according to a ratio of a target rate for replacing said service decisions to an observed service rate at a downstream queue in said network.

12. The method of claim 11 wherein said new service requests are generated for each of said queues according to respective weighted fair rates.

13. The method of claim 12 wherein said weighted fair rates are bounded by at least a minimum rate.

14. A processing circuit, comprising:

a queue controller to determine storage locations of a plurality of cells; and a service controller coupled to the queue controller, the service controller to service a plurality of connection queues according to a fair rate determined by a ratio of a target rate to an observed cell arrival rate at a downstream queue.

15. The processing circuit of claim 14, further comprising a cell memory coupled with the queue controller to store the plurality of cells in the storage locations.

16. The processing circuit of claim 15, further comprising a cell input engine coupled to receive incoming cells and extract information from the incoming cells, the cell input engine coupled with the cell memory to transmit particular cells of the incoming cells to the cell memory based on a signal from the queue controller.

17. The processing circuit of claim 16, further comprising a cell output engine coupled with the cell memory.

18. A machine readable medium having stored thereon instructions, which when executed by a processor, cause the processor to perform the following:

computing a fair rate for servicing cells or packets from a plurality of connection queues according to a ratio of a target rate to an observed cell arrival rate at a downstream queue; and servicing the cells or packets from the connection queues according to the fair rate.

19. The machine readable medium of claim 18, wherein each of the connection queues has an associated weight and each connection queue is serviced at a rate according to the fair rate and the weight associated with the connection queue being serviced.

20. The machine readable medium of claim 18, wherein the fair rate is bounded by a minimum rate and a maximum rate.

21. The machine readable medium of claim 18, wherein each of the connection queues has an associated weight and each connection queue is serviced at a rate according to the fair rate and the weight associated with the connection queue being serviced, the fair rate being bounded by at least a minimum rate.

22. The machine readable medium of claim 18, wherein the fair rate is recomputed after a number of cell arrivals.

23. The machine readable medium of claim 18, wherein the target rate is approximated according to an amount of available bandwidth for the downstream queue and the number of cells serviced from the downstream queue in a period of time.

24. A digital switch, comprising:
   a physical interface;
   a bus interface; and
   a first processing circuit coupled between the physical interface and the bus interface, the first processing circuit comprising:
      a queue controller to determine storage locations of a plurality of cells; and
      a service controller coupled to the queue controller, the service controller to service a plurality of connection queues according to a fair rate determined by a ratio of a target rate to an observed cell arrival rate at a downstream queue.

25. The digital switch of claim 24, wherein the first processing circuit is an ingress circuit.

26. The digital switch of claim 24, wherein the first processing circuit is an egress circuit.

27. The digital switch of claim 24, further comprising an egress circuit coupled between the bus interface and the physical interface and wherein the first processing circuit is an ingress circuit.

28. An apparatus, comprising:
   means for computing a fair rate for servicing cells from a plurality of connection queues according to a ratio of a target rate for servicing said connection queues to an observed cell arrival rate at a downstream queue in a digital network; and
   means for servicing said cells from said connection queues according to said fair rate.

29. The apparatus of claim 28 wherein each of said connection queues has an associated weight and wherein the apparatus further comprises means for servicing each connection queue at a rate according to said fair rate and the weight associated with the connection queue being serviced.

30. The apparatus of claim 29, further comprising means for bounding the fair rate by a minimum rate and a maximum rate.

31. The apparatus of claim 29, further comprising means for approximating said target rate according to an amount of available bandwidth for said downstream queue and the number of cells serviced from said downstream queue in a period of time.

32. The apparatus of claim 29, further comprising means for periodically recomputing said fair rate.

33. The apparatus of claim 32, further comprising means for multiplying said fair rate by a fixed constant at each periodic recomputation if said downstream queue empties during the period preceding the recomputation.

34. The apparatus of claim 29, further comprising means for recomputing said fair rate after a number of cell arrivals or services.

35. The apparatus of claim 29, further comprising means for providing explicit rate control within said network.

36. An apparatus, comprising:
   means for storing service decisions for a number of plurality of queues of cells in a network;
   means for generating new service requests for each of said queues according to a fair rate; and
   means for replacing said service decisions if said new service requests for any of said queues are received, wherein said fair rate is set according to a ratio of a target rate for replacing said service decisions to an observed service rate at a downstream queue in said network.

37. The apparatus of claim 36, further comprising means for generating said new service requests for each of said queues according to respective weighted fair rates.

38. The apparatus of claim 37, further comprising means for bounding said weighted fair rates by at least a minimum rate.

* * * * *